United States Patent
Neumann

(10) Patent No.: US 7,226,212 B2
(45) Date of Patent: *Jun. 5, 2007

(54) SHIELD AND SEALING METHOD FOR A HYDRODYNAMIC BEARING

(75) Inventor: Rudolf Neumann, Spaichingen (DE)

(73) Assignee: Minebea Co., Ltd., Nagano (JP)

( * ) Notice: Subject to any disclaimer, the term of this patent is extended or adjusted under 35 U.S.C. 154(b) by 315 days.

This patent is subject to a terminal disclaimer.

(21) Appl. No.: 10/790,551

(22) Filed: Mar. 1, 2004

(65) Prior Publication Data

US 2005/0190998 A1    Sep. 1, 2005

(51) Int. Cl.
  *F16C 32/06* (2006.01)
(52) U.S. Cl. .................................... 384/119
(58) Field of Classification Search ............. 384/118, 384/119, 120, 130, 132; 277/550
  See application file for complete search history.

(56) References Cited

U.S. PATENT DOCUMENTS

| | | | |
|---|---|---|---|
| 2,966,376 A * | 12/1960 | Reynolds .................. 277/550 |
| 5,368,397 A * | 11/1994 | Freiwald ..................... 384/130 |
| 5,448,120 A | 9/1995 | Schaule et al. |
| 5,558,443 A | 9/1996 | Zang |
| 5,559,651 A | 9/1996 | Grantz et al. |
| 5,575,355 A * | 11/1996 | Williams et al. ........... 184/55.1 |
| 5,697,708 A | 12/1997 | Leuthold et al. |
| 5,800,068 A * | 9/1998 | Wanger ..................... 384/119 |
| 5,876,124 A | 3/1999 | Zang et al. |
| 6,118,620 A | 9/2000 | Grantz et al. |
| 6,575,634 B2 | 6/2003 | Nottingham |
| 6,900,568 B2 * | 5/2005 | LeBlanc et al. ............. 310/90 |
| 2003/0161558 A1 * | 8/2003 | Kishi ........................ 384/107 |

* cited by examiner

Primary Examiner—Thomas R. Hannon
Assistant Examiner—Justin Krause
(74) Attorney, Agent, or Firm—Joel E. Lutzker; John C. Garces; Schulte Roth & Zabel LLP

(57) ABSTRACT

A hydrodynamic bearing system, having a bearing sleeve and a shaft inserted into an inner cylindrical bore of the bearing sleeve. A bearing gap is formed between the shaft and the bearing sleeve, the bearing gap being filled with a lubricating oil. A shield encloses the bearing sleeve. The shield is secured within a recess formed at the top surface of the bearing sleeve at a position distanced from the bearing gap. The shield is pressed against a sharp edge of the recess by a metal ring placed into the recess.

12 Claims, 3 Drawing Sheets

SHIELD AND SEALING METHOD FOR A HYDRODYNAMIC BEARING

FIELD OF THE INVENTION

The present invention generally relates to a field of spindle motors. More specifically, the invention relates to a spindle motor utilizing a fluid dynamic pressure bearing to support a shaft within a bearing portion, the shaft being surrounded by lubricating oil enclosed in the bearing portion.

BACKGROUND OF THE INVENTION

Disk drive memory systems have been used in computers for many years for storage of digital information. Information is recorded on concentric memory tracks of a magnetic disk medium, the actual information being stored in the form of magnetic transitions within the medium. The disks themselves are rotatably mounted on a spindle the information being accessed by means of read/write heads generally located on a pivoting arm which moves radially over the surface of the disk. The read/write heads or transducers must be accurately aligned with the storage tracks on the disk to ensure proper reading and writing of information.

During operation, the disks are rotated at very high speeds within an enclosed housing by means of an electric motor generally located inside the hub or below the disks. One type of motor in common use is known as an in-hub or in-spindle motor. Such in-spindle motors typically have a spindle mounted by means of two ball bearing systems to a motor shaft disposed in the center of the hub. However, with the decreasing size of information storage systems, other types of bearings including hydrodynamic bearings are being developed.

In these types of systems, lubricating fluid, either gas or liquid, functions as the actual bearing surface between a stationary base or housing and the rotating spindle or rotating hub and the stationary surrounding portion of the motor. For example, liquid lubricants comprising oil, more complex ferro-magnetic fluids, or even air have been utilized for use in hydrodynamic bearing systems. The reason for the popularity of the use of air, is the importance of avoiding the outgassing of contaminants into the sealed area of the head disk housing. However, air does not provide the lubricating qualities of oil. Its low viscosity requires smaller bearing gaps and therefore higher tolerance standards to achieve similar dynamic performance.

In the case of a hydrodynamic bearing employing a liquid lubricant, the lubricating fluid and its components must be sealed within the bearing to avoid loss of lubricant which results in reduced bearing load capacity. If too much lubricant evaporates from the bearing, physical surfaces of the spindle and housing can contact one another, leading to increased wear and eventual failure of the bearing system. Equally seriously, loss of a seal or failure to control the fluid level within the bearing system may cause contamination of the hard disk drive with lubricant particles and droplets as well as outgassing-related condensation.

A further difficulty with prior art designs of liquid lubrication hydrodynamic bearings is that, during operation of the spindle motor, lubricating fluid can splash onto the shaft and migrate along the shaft into the environment. To prevent this oil migration and/or splashing, a sealing shield may be provided at one end of the shaft enclosing the bearing system.

An example of a conventional hydrodynamic bearing system 100 incorporating a shield is shown in FIG. 2(*b*). Hydrodynamic bearing system 100 includes a shaft 112 with a bearing element 114 secured thereto. Shaft 112 is inserted into an inner cylindrical bore of bearing sleeve 116 such that a bearing gap is formed between an outer surface of the shaft with the bearing element and an inner surface of the sleeve. The bearing gap is filled with lubricating oil 118. Oil reservoir 122 is provided at the top portion of the bearing gap to accommodate excess oil. Shield 120 having cylindrical opening 132 is placed over shaft 112 and secured to step 126 of bearing sleeve 116 such that its inner surface partially contacts lubricating oil 118. Oil fill hole 128 is provided in the shield to enable injection of lubricating oil 118 into the bearing gap.

During assembly of the conventional hydrodynamic bearing system 100, bearing element 114 is press-fit onto shaft 112 which is then inserted into the inner cylindrical bore of bearing sleeve 116. Shield 120 is then placed onto step 126 of the bearing sleeve such that shaft 112 protrudes through cylindrical opening 132. Shield 120 is then laser welded to the bearing sleeve at reference point 124. Lubricating oil 118 is next injected into the bearing gap through the oil fill hole 128.

For proper functioning of the spindle motor, it is very important to inject an adequate but not excessive amount of lubricating oil through the oil fill hole. However, the above method of assembly does not allow a manufacturer to observe the level of lubricating oil inside the system and therefore to prevent an insufficiency or overflow of lubricating oil. Manufacturer's view is obstructed by the shield. If, however, the shield is secured to the bearing sleeve after the oil is filled, laser welding of the shield causes lubricating oil to overheat because of its close proximity to the shield.

Thus, there is a need in the art for a hydrodynamic bearing system design allowing a manufacturer to observe the level of lubricating oil inside the system in order to prevent an insufficiency or overflow of lubricating oil.

SUMMARY OF THE INVENTION

In one aspect of the present invention, a hydrodynamic bearing system is provided having a bearing sleeve and a shaft inserted into an inner cylindrical bore of the bearing sleeve. A bearing gap is formed between the shaft and the bearing sleeve, the bearing gap being filled with a lubricating oil. An upper surface of the bearing sleeve is provided with a recess having a sharp edge and further having a metal ring positioned therein. A shield encloses the bearing sleeve such that a portion of the shield's wall is pressed against the sharp edge of the sleeve's recess by the provided metal ring. Thus, the shield is secured at to the upper end surface of the bearing sleeve at a position that is distanced from the bearing gap. The shield does not contact the lubricating oil.

In another aspect of the present invention, a method of manufacturing a hydrodynamic bearing system is provided. In accordance with the provided method, a bearing element is first mounted onto a shaft, the shaft is then inserted into a bearing sleeve and a bearing gap formed between the shaft and the bearing sleeve is filled with lubricating oil while observing the fill level of said lubricating oil. The shield is then placed into the recess of the bearing sleeve, such that the shield does not contact the lubricating oil, and is pressed against the sharp edge of the recess by the metal ring.

The above aspects, advantages and features are of representative embodiments only. It should be understood that they are not to be considered limitations on the invention as defined by the claims. Additional features and advantages of the invention will become apparent in the following description, from the drawings, and from the claims.

BRIEF DESCRIPTION OF THE DRAWINGS

The invention is illustrated by way of example and not limitation and the figures of the accompanying drawings in which like references denote like or corresponding parts, and in which.

DETAILED DESCRIPTION OF THE DRAWINGS

Figure 1:
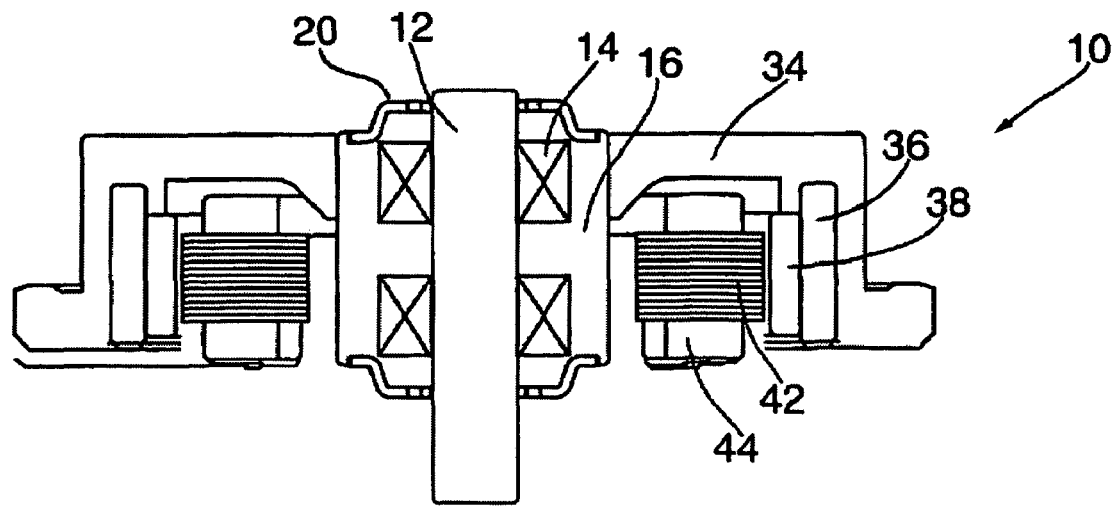
FIG. 1 is a cross-sectional view of a spindle motor having a hydrodynamic bearing system.

As shown in FIG. 1, spindle motor 10 comprises a rotor portion and a stator portion. The rotor portion includes hub 34 having bearing sleeve 16 secured within an inner cavity of hub 34. A magnetic disk (not shown) may be secured to the top of hub 34 for rotation with the hub. Yoke portion 36 is mounted to the lower end of hub 34. Permanent magnet 38 is secured to the yoke portion of hub 34. The stator portion comprises fixed shaft 12 inserted into a cylindrical bore of bearing sleeve 16. Bearing elements 14 are mounted on fixed shaft 12 such that a bearing gap is formed between outer surfaces of the fixed shaft with the bearing elements and an inner surface of the bearing sleeve. Although bearing elements shown in FIG. 1 form a spool bearing, any other type of fluid dynamic bearing can be used with the present invention. For example, conical bearing elements can be used as bearing elements 14.

The bearing gap is filled with lubricating oil 18. Fixed shaft 12 is secured at its bottom end to a frame (not shown) and at its top end to a top cover (not shown). Stator core 42 with winding 44 is secured to the frame such that the stator core is placed in an opposing relationship with permanent magnet 38 of the rotor portion. Under the influence of the magnetic field generated by permanent magnet 38 and stator core 42 with its winding, bearing sleeve 16 with hub 34 rotates around fixed shaft 12 mediated by a film of lubricating oil.

Figure 2B:
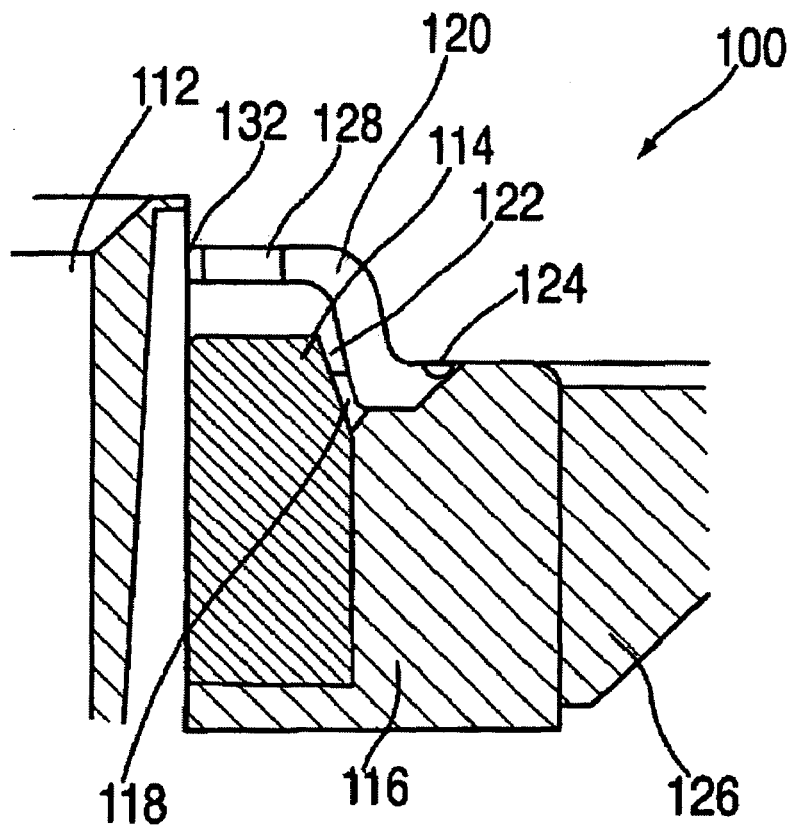
FIG. 2b is a partial cross-sectional view of a hydrodynamic bearing system having a conventional design of the shield and the bearing sleeve.
Figure 2A:
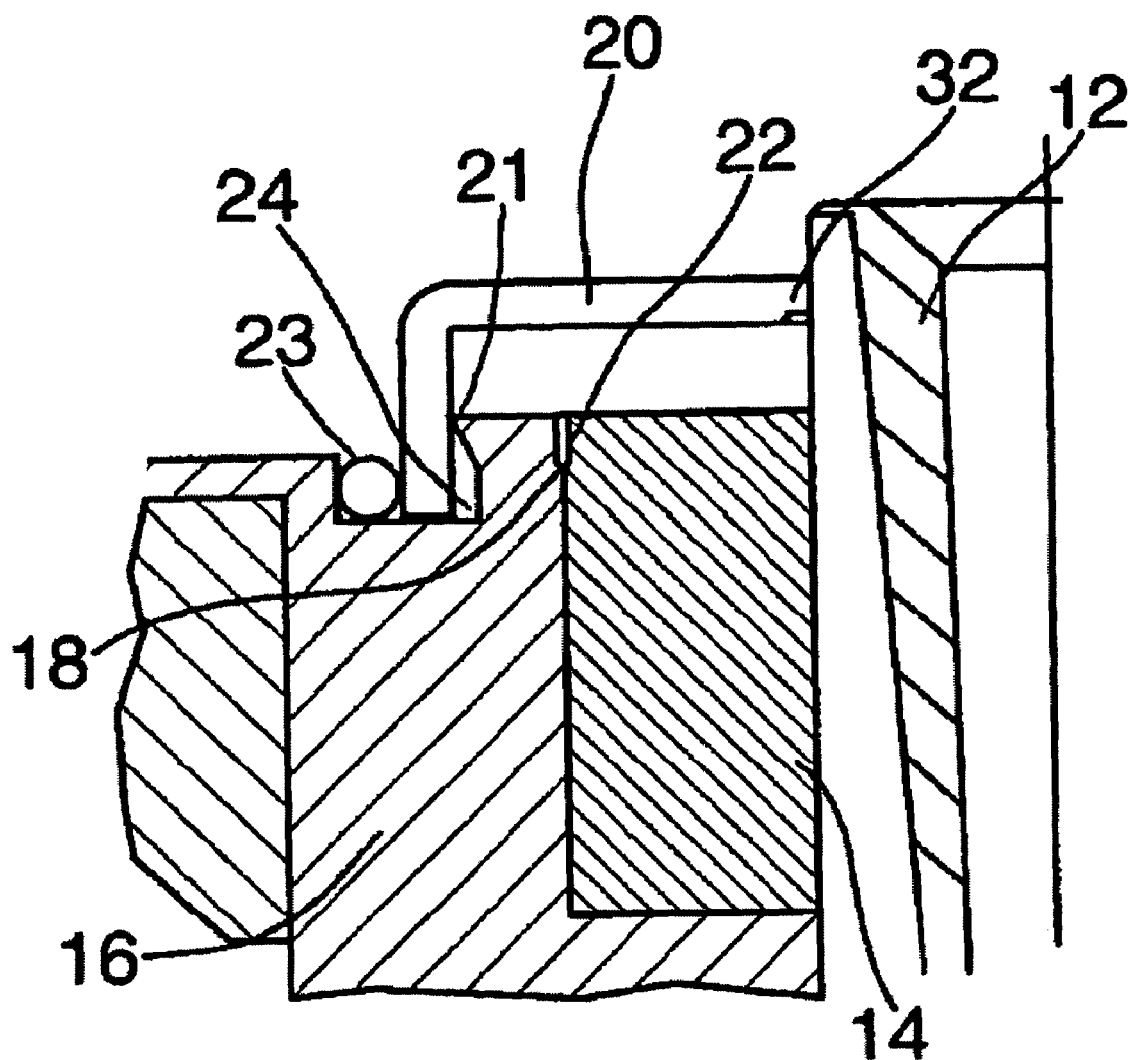
FIG. 2a is a partial cross-sectional view of a hydrodynamic bearing system having a new shield and sleeve design in accordance with the present invention.

As more particularly shown in FIG. 2a, reservoir 22 is formed between bearing sleeve 16 and bearing element 14 at their upper ends to accommodate excess of lubricating oil. Recess 24 is formed at the top edge of the bearing sleeve 16. Shield 20 is placed over the shaft 12 and onto the top surface of bearing sleeve 16 such that the lower portion of the wall of the shield 20 is inserted into the recess 24. Fixed shaft 12 protrudes through cylindrical opening 32 of shield 20.

The recess 24 is further provided with a sharp edge 21, preferably formed at the top of the recess, and a metal ring 23 placed into the recess 24. When the lower portion of the wall of the shield 20 is placed into the recess, the metal ring 23 presses the shield against the sharp edge 21, thus fixedly securing the shield within the recess. In the preferred embodiment, the place of attachment between shield 20 and bearing sleeve 16 is distanced from reservoir 22 and the bearing gap such that shield 20 does not contact lubricating oil 18. Further, since no welding is required for the provided assembly, the bearing sleeve 16 and the lubricating oil 18 are prevented from overheating.

Figure 3:
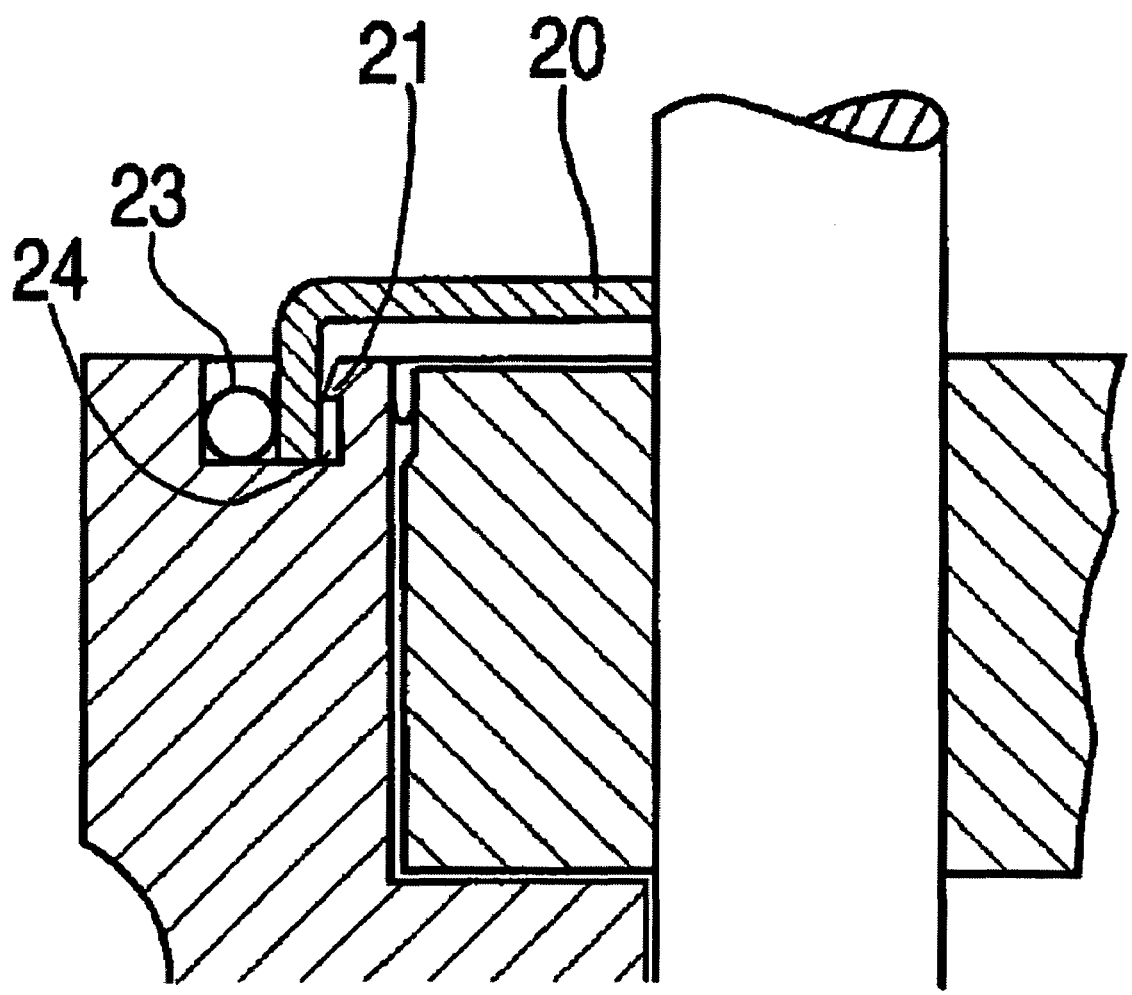
FIG. 3 is a partial cross-sectional view of a hydrodynamic bearing system having a new shield and sleeve design in accordance with another embodiment of the present invention.

As shown in FIG. 3, the sharp edge 21 may be alternatively formed in the midsection of the vertical wall of the recess 24. In this embodiment, the upper surface of the sharp edge 21 may downwardly slope towards the wall of the shield. In the embodiment described above with respect to FIG. 2a, the upper surface of the edge 21 is straight and its lower surface slopes downwardly away from the shield. The embodiment shown in FIG. 2a may be more advantageous where prevention of burs on the surface of the shield is an object.

In order to assemble the hydrodynamic bearing system in accordance with the present invention, bearing element 14 is press-fit onto shaft 12 which is then inserted into the inner cylindrical bore of bearing sleeve 16. Lubricating oil 18 is next filled into the bearing gap. The oil filling process is preferably accomplished using a microdrop method under control of a microscope. Because the shield is not placed over the opening of the bearing sleeve, a manufacturer can easily observe the level of lubricating oil in the bearing gap and reservoir. Thus, insufficiency or overflow of lubricating oil may be prevented. Shield 20 is then placed into recess 24 at the top of the bearing sleeve such that the shield is located against the sharp edge 21 and shaft 12 protrudes through cylindrical opening 32. Shield 20 is then pressed against the sharp edge 21 by the metal ring 23 inserted into the recess 24.

The shield and bearing sleeve design provided by the present invention allows the manufacturer to fill an adequate but not excessive amount of lubricating oil because a manufacturer is able to observe the level of lubricating oil inside the system and therefore to prevent an insufficiency or overflow of lubricating oil. Manufacturer's view is no longer obstructed by the shield. Because the shield is secured within the recess of the sleeve without welding, lubricating oil does not overheat during the laser welding process. Thus, shield can be secured to the bearing sleeve after the oil is filled.

For the convenience of the reader, the above description has focused on a representative sample of all possible embodiments, a sample that teaches the principles of the invention and conveys the best mode contemplated for carrying it out. The description has not attempted to exhaustively enumerate all possible variations. Other undescribed variations or modifications may be possible. For example, where multiple alternative embodiments are described, in many cases it will be possible to combine elements of different embodiments, or to combine elements of the embodiments described here with other modifications or variations that are not expressly described. Many of those undescribed variations, modifications and variations are within the literal scope of the following claims, and others are equivalent.

What is claimed is:

1. A hydrodynamic bearing system, comprising:
   a shaft;
   a bearing sleeve, said bearing sleeve having an inner cylindrical bore and said shaft being inserted into said inner cylindrical bore;
   a bearing gap formed between said shaft and said bearing sleeve, said bearing gap being filled with a lubricating oil; and
   a shield enclosing said bearing sleeve, wherein said bearing sleeve further comprises a recess defining with a top surface of said bearing sleeve, an acute angle, which defines a pointed edge and wherein said shield is secured to said bearing sleeve by being pressed against said pointed edge of said recess.

2. The hydrodynamic bearing system according to claim 1 further comprising at least one ring, said ring being configured to be inserted into said recess to press said shield to said pointed edge.

3. The hydrodynamic bearing system according to claim 2, wherein said ring is a metal ring.

4. The hydrodynamic bearing system according to claim 1 further comprising a lubricating oil reservoir, wherein said shield is secured within said recess of said bearing sleeve at a position that is distanced from said lubricating oil reservoir.

5. The hydrodynamic bearing system according to claim 1, wherein said shield is secured to said bearing sleeve at a position on an end surface that is distanced from said bearing gap, and wherein said shield does not contact said lubricating oil.

6. The hydrodynamic bearing system according to claim 1 further comprising at least one bearing element mounted on said shaft, wherein said bearing gap is formed between said bearing sleeve and said bearing element.

7. A spindle motor having a hydrodynamic bearing system, said hydrodynamic bearing system comprising:
   a shaft;
   a bearing sleeve, said bearing sleeve having an inner cylindrical bore and said shaft being inserted into said inner cylindrical bore;
   a bearing gap formed between said shaft and said bearing sleeve, said bearing gap being filled with a lubricating oil; and
   a shield enclosing said bearing sleeve,
   wherein said bearing sleeve further comprises a recess defining with a top surface of said bearing sleeve, an acute angle, which defines a pointed edge and wherein said shield is secured to said bearing sleeve by being pressed against said pointed edge of said recess.

8. The spindle motor according to claim 7 further comprising at least one ring, said ring being configured to be inserted into said recess to press said shield to said pointed edge.

9. The spindle motor according to claim 8, wherein said ring is a metal ring.

10. The spindle motor according to claim 7 further comprising at least one bearing element mounted on said shaft, wherein said bearing gap is formed between said bearing sleeve and said bearing element.

11. The spindle motor according to claim 7 further comprising a lubricating oil reservoir, wherein said shield is secured within said recess of said bearing sleeve at a position that is distanced from said lubricating oil reservoir.

12. The spindle motor according to claim 7, wherein said shield is secured to said bearing sleeve at a position on an end surface that is distanced from said bearing gap, and wherein said shield does not contact said lubricating oil.

* * * * *